June 12, 1962  J. A. MIKINA  3,038,460
VALVE GEAR TAPPET FOR INTERNAL COMBUSTION ENGINES
Filed March 13, 1961
Fig.1.
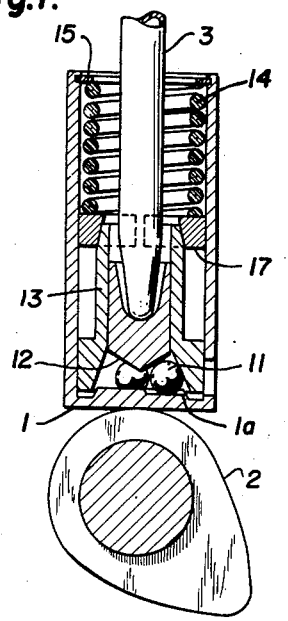
Fig.2a.
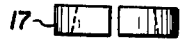
Fig.2b.
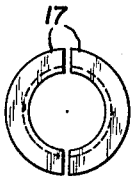
Fig.3.
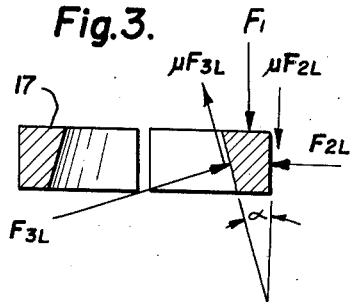
Fig.4.
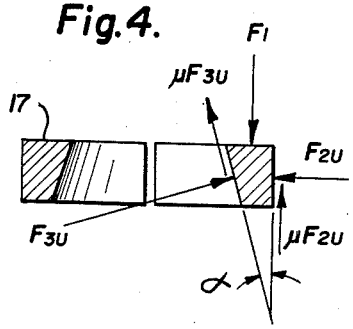
Fig.5.
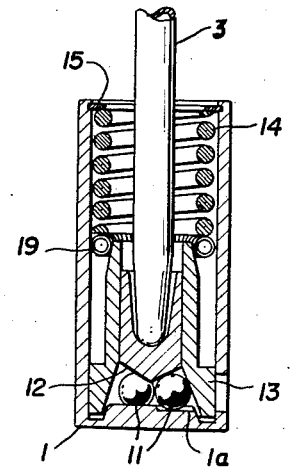
Fig.6a
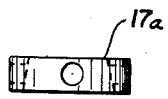
Fig.6b.
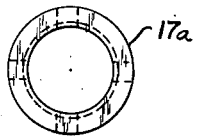
Fig.8a.
Fig.8b.
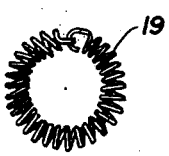
Fig.7.
INVENTOR.
JOHN A. MIKINA
BY
his ATTORNEY United States Patent Office 3,038,460
Patented June 12, 1962

3,038,460
VALVE GEAR TAPPET FOR INTERNAL
COMBUSTION ENGINES
John A. Mikina, 17569 Whitcomb Ave., Detroit, Mich.,
assignor of one-third to Stanley Mikina, and of one-third to Valerie Mikina
Filed Mar. 13, 1961, Ser. No. 95,233
8 Claims. (Cl. 123—90)

This invention relates to a valve gear for internal combustion engines and, more particularly, to a self-adjusting mechanical tappet therefor. This invention is a continuation-in-part of my copending application Serial No. 826,068, filed July 9, 1959, now Patent No. 2,984,227.

In the operation of an internal combustion engine having poppet valves for controlling the intake and discharge of the power cylinder, it is desirable for its efficient performance that the valve motion be accurately defined by the geometry of the lifting cam and by the stiffness of the intermediate mechanism between the cam and the valve. At high engine speeds, accelerations of several hundred times gravity are required to open and close the valves in the short available times within the period of revolution of the crankshaft. Consequently, undesirable transients such as impact against the cam are caused by any valve gear motion which represents a momentary loss in effective cam lift, such as excessive elastic deflections or backlash in the mechanism.

Expedients are available to the engine designer for avoiding such unsatisfactory valve operations, and have been used with moderate success, though not without disadvantages. Elastic deflections are impeded by using a light but rigid actuating mechanism having a high natural frequency of vibration, while hydraulic tappets automatically compensate for system lash due to wear or thermal expansion between cam and valve.

While a properly designed and installed hydraulic valve tappet controls valve gear lash in a satisfactory manner most of the time, those familiar with the art will recognize certain operational vagaries and deficiencies inherent to the system. They will be delineated now in order to emphasize the absence of such disadvantages in the self-adjusting mechanical tappet embodied in the present invention.

(a) It is subject to malfunction due to dirt in the engine oil supply. The ball check valve within the tappet body will make the lifter inoperative if the check valve is kept from closing by dirt on the ball or valve seat.

(b) It is affected by oil viscosity. During cold weather operation in particular, valve clatter occurs in the engine during the initial period when the cold oil is too viscous to flow into and properly fill the hydraulic tappet.

(c) It is subject to malfunction due to entrained air in the oil supply. Loss of engine valve lift will occur due to the increased compressibility of the oil-air mixture, and transient separation and impact in the valve gear will be induced by the excessive elastic deflections of the hydraulic medium.

(d) It is subject to malfunction as a result of overpumping of oil into the tappet oil cylinder. When separation of the cam and tappet occurs during high acceleration transients, oil flow into the tappet cylinder causes the tappet to lengthen, thus keeping the engine valve off its seat when in the closed position.

(e) The tappet piston diameter is small in order to limit the cam loading due to engine oil pressure during the non-lifting phase of cam operation. Hence the tappet piston must be very closely fitted into its cylinder in order to reduce loss of engine valve lift during the lifting phase due to oil leakage past the tappet piston. The necessity for close dimensional and finish control of the tappet piston, cylinder, and check valve seat increases the cost of manufacture, assembly, and inspection.

An object of the present invention is to provide a novel self-adjusting mechanical tappet which is devoid of the above named disadvantages.

A more specific object of the invention is to provide a split ring containing, self adjusting mechanical tappet which requires no hydraulic medium for its operation, but functions principally by virtue of normal and frictional forces between the geometric surfaces of its rigid hardened steel parts. It is thus able to compensate for lash in the valve gear system without the disadvantages listed above for the hydraulic valve tappet. Moreover, through a novel juxtaposition of spring and friction forces and of the geometry of the load carrying surfaces within the tappet, lash in the valve gear system is effectively taken up without imposing any large loads on the cam and tappet during their non-lifting phase of operation, when the tappet rides on the cam base circle.

A still further object of the invention is to provide a self-adjusting mechanical tappet which may be applied in the valve gear, for example, for actuating overhead valves in an internal combustion engine. This operation includes a tappet body that is positioned in an engine block by a guide bearing, and acts to transmit the rise of an actuating cam via the usual train of push-rod to rocker arm to engine valve shaft, where it acts against the force of the valve spring.

Other objects and advantages will become more apparent with a study of the following description taken with the accompanying drawings wherein:

FIG. 1 is a vertical cross-sectional view of a self-adjusting mechanical tappet embodying a split-ring and for use in internal combustion engines;

FIG. 2a is a side view and FIG. 2b is a top view of the split ring in FIG. 1;

FIGS. 3 and 4 are enlarged, cross-sectional views of the split ring showing the direction of forces referred to in the equations contained in the specification;

FIG. 5 is a vertical, cross-sectional view of a modification of the tappet employing balls 18 in a solid ring 17a instead of a split ring;

FIG. 6a is a side view and FIG. 6b is a top view of the solid ring in FIG. 5;

FIG. 7 is a vertical cross-sectional view of a still further modification of the tappet employing a garter spring instead of a split ring;

FIG. 8a is a side view and FIG. 8b is a top view of the garter spring in FIG. 7.

Within the tappet body 1 which may be slidably mounted in the engine block, is located a plurality of hardened steel balls 11 so situated as to be in contact with the inner base of body 1, with the outer cone of the end of plunger member 12, and with the inner cone of the telescoping sleeve member 13. The inner base of the tappet body is drilled and reamed to form three equally spaced radial grooves or races 1a for the balls. The ball and cone assembly is kept together in contact by means of a loading spring 14 which is retained within body 1 by means of a snap ring 15. A split ring 17 will be discussed later.

The function of the ball and cone geometry is to give the force of spring 14 a large mechanical advantage relative to push rod 3 so that a comparatively small and light spring 14 is able to oppose a large part of the large load forces acting on push rod 3 and the tappet body 1. During the valve lifting phase of the cam operation, the various friction forces within the tappet mechanism add their effect to that of spring 14 in developing reactions that enable the valve lifting load to be transmitted from cam 2 to push-rod 3. However, during the dwell period when the tappet rides on the cam base circle, these internal friction forces oppose the force of loading spring 14, with the result that only a comparatively small difference in loading appears between the tappet body and the cam.

This is advantageous in that it prolongs the useful life of the cam and tappet surfaces by restricting the high loading phase between them to that part of the cycle of operation wherein the tappet contacts the part of the cam above its base circle.

The operation and the advantages of the friction-restrained ball-cone-spring and split ring combination are amenable to mathematical analysis which will be discussed shortly. When the system lash has been taken up, the subsequent displacements of the internal tappet mechanism relative to the tappet body are so minute (of the order of microinches of surface strain) that the force equilibrium of the parts can be treated as a problem in statics.

In my copending, earlier patent application Ser. No. 826,068, I show a mechanism, for automatic take-up of lash in valve gear, in which the load transmitting forces between balls 11 and conical surfaces 12 and 13 are maintained by means of the cooperating helical spring 14 and the initially bowed flat springs 16.

The present invention relates to an improvement in the basic self-adjusting tappet mechanism by means of which the springs 16 are eliminated and certain operating advantages are secured as well.

One embodiment of this invention is shown in FIGS. 1 and 2. The elements 1, 2, and 11, 12, 13, 14 and 15 inclusive refer to the same objects that are described in my original patent application. The tappet body 1 is maintained in contact with the lifting cam 2 by means of a helical biasing spring 14. The downward force of spring 14 is transmitted to member 13 by means of a split ring 17 whose internal cone of included angle $2\alpha$ (see FIGS. 3 and 4) match the external cone on the upper end of member 13, and whose external cylindrical surface bears against the inner cylindrical surface of tappet body 1.

The effect of these cooperating surfaces is to cause spring 14 to drive each half of the split ring 17 as a wedge between member 13 and tappet body 1. As a result of this wedge action, large forces are produced normal to the cone surfaces as well as between the outer surface of the split ring and the inner bore of body 1.

These lateral forces then result in vertical friction forces which oppose the displacement of member 13 within the bore of body 1. Thus, the split ring produces a motion impeding friction force just like the flat springs 16 do in the original disclosure. The plurality of springs 16 has thus been replaced by a two-piece member 17.

The split-ring configuration has its own peculiarities and advantages which become apparent only after an analysis of its equations of force equilibrium. Referring to FIG. 3, consider first the loading phase of the tappet operation, when the cam 2 is lifting the tappet and connecting valve gear. Let the force of spring 14 be $F_1$, and denote the normal force between 17 and body 1 by $F_{2L}$, and that normal to the cone surfaces by $F_{3L}$, the subscript L indicating the loading condition. The equations of static equilibrium of the split ring give (1) $$F_{2L} = \frac{F_1(1-\mu \tan \alpha)}{(1+\mu^2) \tan \alpha}$$

in which $\mu$ is the coefficient of friction between the sliding parts, and $\alpha$ is half the included cone angle.

The upward displacement of member 13 is thus opposed by a combined force equal to $F_1 + \mu F_{2L}$, or (2) $$F_1 + \mu F_{2L} = F_1 \left[ \frac{1+\mu(1-\mu \tan \alpha)}{(1+\mu^2) \tan \alpha} \right]$$

During the unloading or dwell phase of the tappet operation, when the tappet body 1 rests on the circular arc portion of cam 2, the acting forces on the split ring 17 are as shown in FIG. 4. (For purposes of analysis, both halves of the split ring in FIGS. 3 and 4 are treated as one rigid body.) The helical spring force is again $F_1$, but the force between 1 and 17 is denoted by $F_{2U}$ while that between 17 and 13 is denoted by $F_{3U}$, the subscript U indicating the unloading condition.

The equations of static equilibrium of the split ring this time give (3) $$F_{2U} = \frac{F_1(1-\mu \tan \alpha)}{(1-\mu^2) \tan \alpha + 2\mu}$$

The downward displacement of member 13 is thus opposed by a combined force equal to (4) $$F_1 - \mu F_{2U} = F_1 \left[ \frac{1-\mu(1-\mu \tan \alpha)}{(1-\mu^2) \tan \alpha + 2\mu} \right]$$

From Equation 4, it may be concluded that to avoid sticking of the split-ring taper and to allow lash take up, the expression in the brackets [ ] must be greater than zero, which leads to the condition that $\tan \alpha > \mu$. Since $\mu$ is of the order of 0.1 for hardened and ground surfaces, $\tan \alpha$ must be made greater than 0.1 by a sufficient margin to insure mechanism reversibility. To satisfy this requirement, let $\tan \alpha = .15$, thus making the included angle 2 of the ring taper equal to 17°. Now to accomplish the same result as obtained in my invention described in my earlier application, with a combined force of 30 lbs. due to spring 14 and springs 16, expression (4) is set to equal to 30 lbs. and solving for $F_1$, $$F_1 = \frac{30}{1 + \frac{.1(1-.1 \times .15)}{(1+.01) \times .15}} = 18.2 \text{ lbs.}$$

Thus, the required force of the helical spring is about the same here as the 17.5 lbs. determined in my original application.

Continuing the analysis, since $$F_1 + \mu F_{2L} = 30 \text{ lbs., and } F_1 = 18.2 \text{ lbs.}$$

then, $$F_{2L} = \frac{30 - 18.2}{\mu} = \frac{11.8}{.1} = 118 \text{ lbs.}$$

This compares to 130 lbs. for the total radial force of springs 16 in the earlier copending application.

During the unloading condition, i.e. at cam 2 dwell, the split-ring design gives, with $\tan \alpha = .15$, by Equation 3:

$$F_{2U} = 51.4 \text{ lbs.}$$

The downward force on the inner sleeve 13 of the tappet is thus:

$$F_1 - \mu F_{2U} = 18.2 - .1 \times 51.4 = 13.06 \text{ lbs.}$$

This compares to $F_1 - \mu F_{2U} = 4$ lbs. for the flat spring design. Since for $F_1 - \mu F_2 = 4$ the cam load is 12.7 lbs. as determined in the first invention, the cam loading for $F_1 - \mu F_{2U} = 13.06$ is $$\frac{13.06}{4} \times 12.7 = 41.4 \text{ lbs.}$$

The value of $F_1 - \mu F_2 = 4$ obtainable with the flat spring design of the first invention is rather optimistic, since no allowance is made there for a possible increase in the coefficient of friction $\mu$. Thus, if $F_1 = 17$ lbs. and $\mu F_2 = 13$ lbs. initially, only a small increase in $\mu$ could make $\mu F_2 > F_1$, and the inner sleeve 13 of the tappet could not move down to take up lash. To provide for this contingency, the tappet should be engineered to make $F_1$ sufficiently large so that it will always be greater than $\mu F_2$. For example, it may be assumed that $F_1 = 25$ lbs. instead of 17. Then, for loading or cam lift $$F_1 + \mu F_2 = 25 + 13 = 38 \text{ lbs.}$$

The tappet of the first invention could then sustain a valve rod load of $500 \times 38/30 = 633$ lbs. However, during unloading at cam dwell, $F_1 - \mu F_2 = 25 - 13 = 12$ lbs. Thus at dwell, the cam load is $12/4 \times 12.7 = 38.1$ lbs., which is virtually the same as the 41.4 lb. cam loading with the split ring design.

The split-ring design of this invention and the flat-spring design of the earlier invention are thus practically equivalent in their ideal performance. However, the split-ring design does possess a very important practical advantage and that is that Equation 4 for $F_1-\mu F_{2U}$ is not affected to as great a degree as the flat spring design by variations in either the coefficient of friction $\mu$ or in $F_1$ due to manufacturing tolerances.

Relation (4) shows that the split-ring design does not require that the large helical spring force $F_1$ be matched by another nearly as large a force equal to $\mu$ times the radial force of flat springs 16. One may expect that the force of a helical spring will vary in production due to small changes in wire diameter, coil diameter, alloy constitution, or heat treatment. Hence in the flat-spring design, the force on the cam during dwell will vary from valve to valve, since it depends on the small difference $F_1-\mu F_2$ between two inherently variable large quantities. For example, a 10% change in $F_1$ ($\approx 25$ lbs.) makes $$F_1-\mu F_2 = 1.1 \times 25 - .1 \times 130 = 14.5 \text{ lbs.}$$

or a change of 21% with respect to $$F_1-\mu F_2 = 25 - .1 \times 130 = 12 \text{ lbs.}$$

This will be worse if the flat springs also vary from lot to lot.

With the split ring, on the other hand, if $F_1$ changes 10%, $F_1-\mu F_{2U}$ will also change only 10%, because the axial force and the lateral ring force are both caused by the same spring 14. In production this is an important advantage, as it will not require the helical springs 14 to be too accurately made or matched.

Another great advantage of the present split-ring embodiment of my basic self-adjusting tappet is that it is relatively insensitive to changes in the coefficient of friction at the internal working surfaces of the mechanism. If, for example, the coefficient of friction changes from .1 to .15, the value of $F_1-\mu F_2$ becomes $$25 - .15 \times 130 = 5.5 \text{ lbs.}$$

for the earlier flat-spring design. In the case of the split ring, however, $$F_1-\mu F_{2U} = 18.2 - .15 \times 51.4 = 10.5 \text{ lbs.}$$

Thus, in the flat-spring case the cam loading during dwell will change from 12 to 5.5 lbs., or 54%, whereas in the split-ring case the change in cam load due to a change in $\mu$ is only 13.06 to 10.5 lbs., or 19.6%. Such relative constancy of operating characteristics is most desirable as it makes the initial design of the mechanism more predictable.

Instead of using a split ring for the wedging elements between members 1 and 13, a solid ring 17a may be used as a ball retainer as shown in FIGS. 5 and 6, with the balls 18 serving as wedging elements between 1 and 13 by moving radially in drilled and reamed clearance holes in ring retainer 17a.

Another embodiment of the basic wedging idea is shown in FIGS. 7 and 8, which depict an elastic wedging member 19 in the form of a garter spring interposed between members 1 and 13 of the tappet assembly. This has the advantage of distributing the wedging forces over a large number of individual spring turns, thus reducing surface wear at the rubbing surfaces.

The basic equations developed for the split-ring design of FIG. 1 apply also to the embodiments of FIGS. 5 and 7, since in all cases the included angle of the top taper of member 13 is equal to $2\alpha$.

Thus it will be seen that I have provided an efficient, self-adjusting mechanical poppet which is devoid of hydraulic fluid and its inherent disadvantages and which comprises mechanical automatic take-up means for automatically compensating for lash; furthermore, I have provided a poppet having a mechanical, automatic take-up means disposed in an optimum manner so as to provide immediate take-up for lash and provide reliable valve operation throughout the entire life of the valve gear.

While I have illustrated and described several embodiments of my invention, it will be understood that these are by way of illustration only, and that various changes and modifications may be made within the contemplation of my invention and within the scope of the following claims.

I claim:

1. In an internal combustion engine having a tappet valve for controlling the flow of combustible fluid in the cylinder and a valve gear for operating said valve, said valve gear including a tappet comprising a hollow cylindrical body, mechanical automatic take-up means contained within said body and comprising a ring frictionally slidable against the inner wall surface of said body, a wedging element longitudinally slidable in said body into wedging engagement with the inner diameter of said ring for increasing the friction of the ring as it slides against said inner wall surface, a spring for engaging said ring for applying a wedging force to said ring, said ring being split and formed of two confronting semi-circular elements, said ring elements being wedge shaped along their inner diameter.

2. In an internal combustion engine having a tappet valve for controlling the flow of combustible fluid in the cylinder and a valve gear for operating said valve, said valve gear including a tappet comprising a hollow cylindrical body, mechanical automatic take-up means contained within said body and comprising a ring frictionally slidable against the inner wall surface of said body, a wedging element longitudinally slidable in said body into wedging engagement with the inner diameter of said ring for increasing the friction of the ring as it slides against said inner wall surface, a spring for engaging said ring for applying a wedging force to said ring, said ring being continuous, and a plurality of balls mounted in said ring for applying the wedging force.

3. Apparatus as recited in claim 2 wherein said ring means has a wedge shaped inner diameter.

4. In an internal combustion engine having a tappet valve for controlling the flow of combustible fluid in the cylinder and a valve gear for operating said valve, said valve gear including a tappet comprising a hollow cylindrical body, mechanical automatic take-up means contained within said body and comprising a ring frictionally slidable against the inner wall surface of said body, a wedging element longitudinally slidable in said body into wedging engagement with the inner diameter of said ring for increasing the friction of the ring as it slides against said inner wall surface, a spring for engaging said ring for applying a wedging force to said ring, said ring being a garter spring comprising a helically coiled annulus.

5. A tappet for valve gear of an internal combustion engine comprising a hollow cylindrical body and a push-rod having one end extending into said body, a plurality of transmission balls, a plunger axially slidable in said body engaging said push-rod, at one end, and having a substantially conical surface at the other end in contacting relationship with said balls so as to force them substantially radially outwardly as the result of movement of the plunger towards the balls, a sleeve surrounding said plunger and being axially slidable relative thereto as a consequence of said radially outward movement of said balls, one end of said sleeve being wedge shaped along its outer surface, a ring, a spring normally urging the inner diameter of said ring against the wedge shaped portion of said sleeve, whereby wedging of said sleeve against said ring will cause radial expansion of the ring and increase in friction of the ring as it slides against the inner wall surface of said body.

6. Apparatus as recited in claim 5 wherein said ring is split into two, confronting halves, each being wedge shaped along the inner diameter of the ring.

7. Apparatus as recited in claim 5 wherein said ring is continuous, and a plurality of balls mounted in said ring for applying the wedging force.

8. Apparatus as recited in claim 5 wherein said ring is in the form of a garter spring.

References Cited in the file of this patent

UNITED STATES PATENTS

| | | |
|---|---|---|
| 1,806,230 | Williams | May 19, 1931 |
| 1,806,231 | Williams | May 19, 1931 |
| 2,234,718 | Anglada | Mar. 11, 1941 |